July 20, 1943.                R. W. ALLEN ET AL                2,324,995
                          METHOD OF BALING RUBBER
                           Filed June 11, 1941
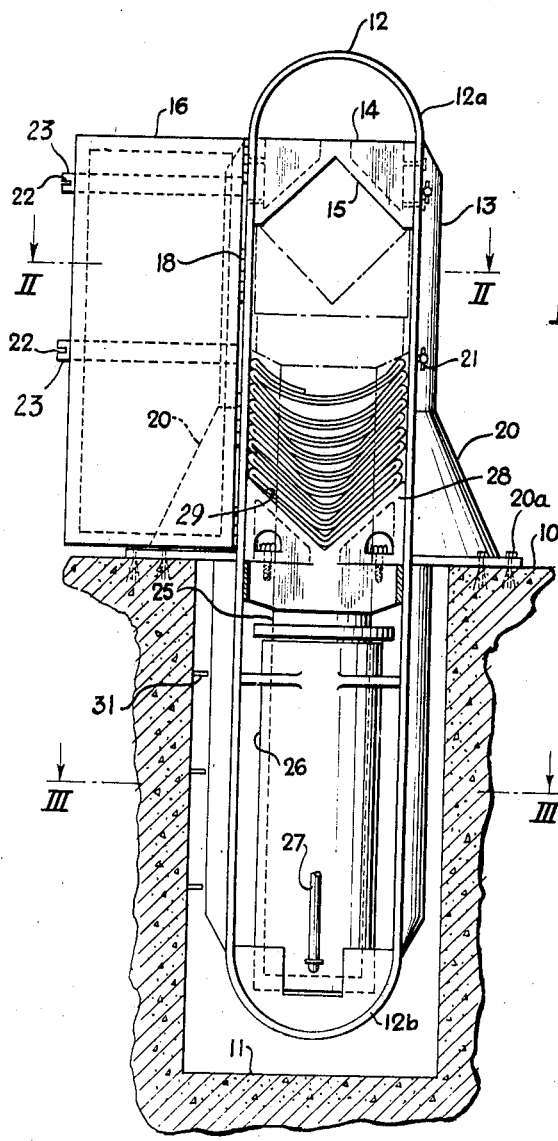
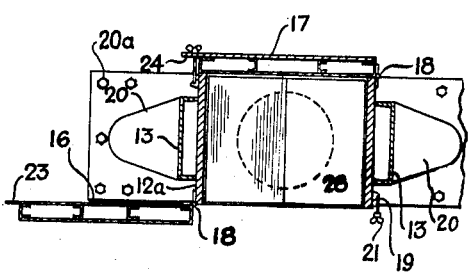
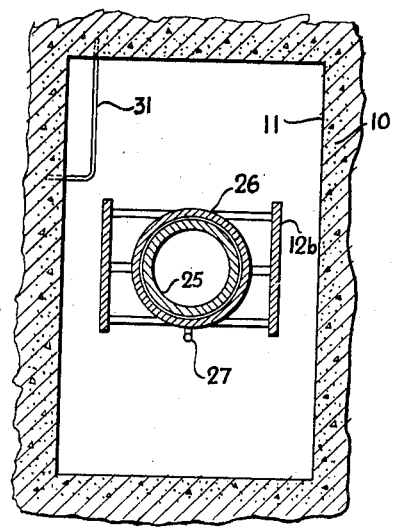
Inventor
RAYMOND W. ALLEN
AND
WILLIAM T. RUNALS
By
Attorneys Patented July 20, 1943

2,324,995

UNITED STATES PATENT OFFICE 2,324,995

METHOD OF BALING RUBBER

Raymond W. Allen and William T. Runals, Akron, Ohio, assignors to The Firestone Tire & Rubber Company, Akron, Ohio, a corporation of Ohio Application June 11, 1941, Serial No. 397,648

1 Claim. (Cl. 18—48)

This invention relates to an improved method of baling rubber, to a uniform density rubber bale adapted to be shipped without the use of external confining means.

Heretofore, rubber bales ordinarily have been formed in presses having opposed parallel surfaces which are moved toward each other to compress the rubber therebetween, and with this method the removal of resultant bale of compressed rubber was difficult. It is also impossible to get a uniformly compressed bale because of the friction of the rubber when travelling under pressure against the sides of the press. The excessive frictional resistance between the rubber and metal walls of the press is sufficient to overcome the energy administered by the ram pressure. Then too, the bales usually require use of a covering material.

While these bales have been used for many years, they are not entirely satisfactory, due to the appreciable labor and material cost involved, and also because the bales are not made of uniform density rubber, and may have voids therein. Since rubber bales are shipped long distances and the freight charge thereof depends upon the volume of the bale, rather than the weight thereof, the presence of voids in the bale, or formation of non-uniform densities, appreciably increases the freight cost on the rubber.

The general object of the present invention is to overcome the foregoing and other difficulties of, and objections to, present types of rubber baling methods, and to provide a novel, improved method for forming a compact, solid rubber bale of uniform density.

Another object of the invention is to provide a sturdy, uncomplicated rubber baling apparatus adapted to stand long, hard usage.

Another object of the invention is to provide a method for compacting a maximum amount of rubber in a minimum amount of space with a minimum amount of energy.

The foregoing and other objects will be apparent as the description of the invention proceeds.

In the accompanying drawing:

Figure I is an elevation, partly in section, of apparatus embodying the invention and for practice of the invention; and Figures II and III are sections taken on lines II—II and III—III of Figure I.

Referring specifically to the accompanying drawing, a concrete base, or other supporting means, 10 is shown which has a large hole 11 formed therein. A substantially oval shaped frame 12 is mounted on the concrete base 10 by brackets 20 secured in any desired manner to opposite sides of the frame and anchored to the base 10 by bolts 20a. The frame includes an upper section 12a and a lower section 12b, with the lower section extending into the hole 11, while channel members 13, which may be integrally secured to the brackets 20, are secured to the outer walls of the upper portions of the frame 12 to reinforce same. A die block 14 having an inverted V-shaped lower surface 15 is suitably secured to the upper end of the frame member 12a. The surface 15 is formed by two planar surfaces, each of which is at an angle of 45° with the vertical so that they form a right angle therebetween.

In order to form an inclosed chamber from the upper section 12a of the frame 12, doors 16 and 17 are pivotally secured to the frame 12a by hinges 18. Means, such as bolts 19 having wing nuts 21 thereon, are pivotally secured to the frame and are adapted to engage with slots 22 formed in bars 23 and 24 carried by the doors 16 and 17, respectively, whereby the doors can be locked in closed position by screwing the wing nuts 21 down on the bars after the rubber to be baled is inserted into the upper section of the frame 12 and the doors closed to form a chamber therein. It will be seen that only one of the doors is essential and that the second door may be permanently secured to the frame.

The means for compressing rubber confined within the chamber formed in the frame 12a include a ram 25 which is slidably received in a cylinder 26 that is secured in, or formed integrally with, the lower section 12b of the frame 12. A pipe 27 extends from the lower portion of the cylinder 26 and connects to a suitable source (not shown) of hydraulic pressure whereby the ram 25 can be forced upwardly with relation to the cylinder. Upon suitable adjustment of the hydraulic pressure means, the ram may be allowed to move downwardly, due to its own weight at the completion of the baling operation, or a second pipe (not shown) may connect to the upper end of the cylinder for introducing a pressure medium for forcing the ram downwardly. A ram head 28, having a V-shaped upper surface 29, formed similarly to the surface 15, is carried by the ram 25. The ram head 28 is adapted to be moved into abutting relationship with the die block so that the edges of their V-shaped surfaces are in contact. The inclined surfaces of the head and block are designed so that they form an inclosure which is diamond-shaped in a vertical plane. The inclosure is a square but is tilted on one end.

In practice of the invention, the rubber to be baled preferably is formed into a continuous sheet whose width is substantially equal to a dimension, such as the depth, of the bale to be formed in the apparatus, or the rubber may be formed in separate short sections, each of which has a width, or a length, which is substantially equal to the depth of the rubber bale desired. The mass of rubber to be baled is placed in the apparatus so that the dimension of the rubber equal to the depth of the bale extends in such direction in the apparatus. The upper frame section 12a confines the length of the rubber inserted therein so that its length in the apparatus cannot be greater than the diagonal of a section taken through the square side of the bale desired. Next, the control means and hydraulic pressure supply are arranged so that fluid is introduced into the cylinder 26 through the pipe 27 and the ram head 28 is moved up into engagement with the die block 14. Obviously such movement of the ram head forces substantially all of the rubber carried by the ram head to flow from its substantially flat position in order to fill the die block 14 and the lower portion of the ram head 28.

By using compressing members having inclined surfaces, an improved, compact, uniform density rubber bale is formed because the rubber, being plastic and being compressed in two directions at once, flows together much more than when only compressed in one direction. The rubber composing the bale flows sufficiently and is plastic so that it retains its shape after the compressing force is removed and it can be shipped without any external confining means therearound. The formation of voids in the bale is avoided. For example, the size of most rubber bales is 24" x 19" x 19", which bales contain about 225 pounds of rubber. Rubber bales formed in accordance with applicants' invention, and of the same size as regular bales, contain around 275 pounds of rubber so that appreciable savings in the freight charges on the bale are effected. Also, appreciable reductions are effected in the labor and material cost required to crate and uncrate the rubber bales.

Metal rings 34 may be secured to the walls of the hole 11 to facilitate access to the lower portion of the apparatus.

It will be understood that the depth of the bale formed is equal to the distance between the inner surfaces of the doors 17 and 16 and that such distance may have any desired relation to the sizes of the faces of the die block and die.

The detailed description of the particular embodiment of the invention illustrated and described herein is not to be construed as limiting the invention thereto. The invention includes all features of patentable novelty residing in the foregoing description and the accompanying drawing.

What is claimed is:

The method of forming a compact rubber bale consisting of the steps of stacking a plurality of rubber sheets upon a V-shaped ram head within an open compression chamber through an open door, closing and locking said door whereby said compression chamber is converted into a tightly closed chamber, forcing said ram head toward a V-shaped die block and compressing the rubber between said head and block thereby progressively causing the said rubber to flow into a compact bale while preventing the escape of the rubber from between the head and the block by the close association of the walls of said compression chamber and said die block, completing the cycle of the operation by moving said ram head away from said die block, unlocking said door, and removing the formed bale of rubber through the door.

RAYMOND W. ALLEN.
WILLIAM T. RUNALS.